US011875742B2

(12) United States Patent
Xu et al.

(10) Patent No.: US 11,875,742 B2
(45) Date of Patent: Jan. 16, 2024

(54) DISPLAY DRIVE CIRCUIT AND DRIVE METHOD THEREOF, AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Wenpeng Xu, Beijing (CN); Dianzheng Dong, Beijing (CN); Qiang Zhang, Beijing (CN); Guangxing Wang, Beijing (CN); Haiqin Huang, Beijing (CN); Wan Lin, Beijing (CN); Haixu Wang, Beijing (CN); Leiyang Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/764,163

(22) PCT Filed: May 19, 2021

(86) PCT No.: PCT/CN2021/094552
§ 371 (c)(1),
(2) Date: Mar. 25, 2022

(87) PCT Pub. No.: WO2021/249137
PCT Pub. Date: Dec. 16, 2021

(65) Prior Publication Data

US 2022/0398979 A1 Dec. 15, 2022

(30) Foreign Application Priority Data

Jun. 11, 2020 (CN) ......................... 202010530063.3

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2310/0291* (2013.01); *G09G 2320/0233* (2013.01)

(58) Field of Classification Search
CPC ............... G09G 3/3233; G09G 3/3291; G09G 2310/0291; G09G 2320/0233
See application file for complete search history.

(56) References Cited

U.S. PATENT DOCUMENTS 10,636,357 B1 4/2020 Brownlow
2004/0095297 A1 5/2004 Libsch et al.
(Continued)

FOREIGN PATENT DOCUMENTS

CN 201403226 Y 2/2010
CN 102651192 A 8/2012
(Continued)

OTHER PUBLICATIONS

China Patent Office, First Office Action dated Jan. 5, 2021 for application No. CN202010530063.3.

*Primary Examiner* — Kenneth B Lee, Jr.
(74) *Attorney, Agent, or Firm* — HOUTTEMAN LAW LLC

(57) ABSTRACT

A display drive circuit, a drive method thereof, and a display device are disclosed. The display drive circuit includes: a pixel circuit and a compensation circuit, the pixel circuit includes: a drive transistor, a light emitting device, a storage capacitor, and a gating sub-circuit configured to control connection and disconnection between the control electrode of the drive transistor and a control terminal of the compensation circuit and connection and disconnection between a second electrode of the light emitting device and a sensing (Continued)

terminal of the compensation circuit in response to a signal of a scanning line; the compensation circuit includes: a voltage generating sub-circuit configured to generate a sensing voltage according to the drive current and a target data voltage, and a voltage adjusting sub-circuit configured to adjust a voltage of the control terminal according to the sensing voltage and a voltage of a second power supply terminal.

19 Claims, 4 Drawing Sheets

(56) References Cited

U.S. PATENT DOCUMENTS

| | | | | |
|---|---|---|---|---|
| 2006/0087247 | A1 | 4/2006 | Malmberg | |
| 2010/0073357 | A1 | 3/2010 | Min et al. | |
| 2018/0166025 | A1* | 6/2018 | Zhou | G09G 3/3233 |
| 2020/0105191 | A1* | 4/2020 | Chen | G09G 3/006 |
| 2020/0152125 | A1* | 5/2020 | Ye | G09G 3/3233 |
| 2021/0233458 | A1* | 7/2021 | Yang | G09G 3/3225 |

FOREIGN PATENT DOCUMENTS

| | | | |
|---|---|---|---|
| CN | 102654975 | A | 9/2012 |
| CN | 103077662 | A | 5/2013 |
| CN | 104123912 | A | 10/2014 |
| CN | 105139799 | A | 12/2015 |
| CN | 105427808 | A | 3/2016 |
| CN | 106057130 | A | 10/2016 |
| CN | 106847187 | A | 6/2017 |
| CN | 108269537 | A | 7/2018 |
| CN | 108831384 | A | 11/2018 |
| CN | 109119026 | A | 1/2019 |
| CN | 109712566 | A | 5/2019 |
| CN | 110264957 | A | 9/2019 |
| CN | 111583864 | A | 8/2020 |
| KR | 20110099581 | A | 9/2011 |

* cited by examiner

DISPLAY DRIVE CIRCUIT AND DRIVE METHOD THEREOF, AND DISPLAY DEVICE

CROSS REFERENCE TO RELATED APPLICATION

This is a National Phase Application filed under 35 U.S.C. 371 as a national stage of PCT/CN2021/094552, filed on May 19, 2021, an application claims priority to Chinese patent application No. 202010530063.3, filed on Jun. 11, 2020, the contents of which are incorporated herein by reference in their entirety.

TECHNICAL FIELD

The present disclosure relates to the field of display technology, and in particular, to a display drive circuit, a drive method thereof, and a display device.

BACKGROUND

Organic light emitting diode (OLED) display panels have been applied more and more widely. In the OLED display panel, the drive current is generated by a drive transistor in a saturated state to drive a light emitting device to emit light. However, at present, in an OLED display panel, the light emitting device has poor brightness uniformity.

SUMMARY

The present disclosure aims to solve at least one of the technical problems in the related art, and provides a display drive circuit, a drive method thereof, and a display device.

To achieve the above objectives, the present disclosure provides a display drive circuit, including: a pixel circuit and a compensation circuit, wherein the pixel circuit includes: a drive transistor, a light emitting device and a storage capacitor, two terminals of the storage capacitor are connected to a control electrode and a first electrode of the drive transistor, respectively, the first electrode of the drive transistor is connected to a first power supply terminal, a second electrode of the drive transistor is connected to a first electrode of the light emitting device, and the drive transistor is configured to provide a drive current to the light emitting device;

the pixel circuit further includes: a gating sub-circuit configured to control connection and disconnection between the control electrode of the drive transistor and a control terminal of the compensation circuit and control connection and disconnection between a second electrode of the light emitting device and a sensing terminal of the compensation circuit in response to a signal of a scanning line; and the compensation circuit includes:

a voltage generating sub-circuit configured to generate a sensing voltage positively correlated with the drive current according to the drive current flowing through the light emitting device and a target data voltage of a data receiving terminal, and a voltage adjusting sub-circuit configured to adjust a voltage of the control terminal according to relationship of magnitude between the sensing voltage output by the voltage generating sub-circuit and a voltage of a second power supply terminal until the sensing voltage output by the voltage generating sub-circuit is equal to the voltage of the second power supply terminal.

In some embodiments, the voltage adjusting sub-circuit includes: a comparison module, a first resistance module and a second resistance module, the comparison module is connected to the voltage generating sub-circuit, the second power supply terminal and the second resistance module, the comparison module is configured to output a voltage to the second resistance module, and when the sensing voltage output by the voltage generating sub-circuit is greater than the voltage of the second power supply terminal, the output voltage is increased until the sensing voltage output by the voltage generating sub-circuit is equal to the voltage of the second power supply terminal; when the sensing voltage output by the voltage generating sub-circuit is less than the voltage of the second power supply terminal, the output voltage is decreased until the sensing voltage output by the voltage generating sub-circuit is equal to the voltage of the second power supply terminal; and the first resistance module and the second resistance module are connected in series between the first power supply terminal and the second power supply terminal, a connecting node between the first resistance module and the second resistance module is the sensing terminal of the compensation circuit, the second resistance module has an adjustable resistance, and the resistance of the second resistance module is positively correlated with the output voltage of the comparison module.

In some embodiments, the comparison module includes an operational amplifier, a non-inverting input terminal of the operational amplifier is connected to the voltage generating sub-circuit, an inverting input terminal of the operational amplifier is connected to the second power supply terminal, and an output terminal of the operational amplifier is connected to the second resistance module.

In some embodiments, the first resistance module includes a first resistor, two terminals of the first resistor are connected to the first power supply terminal and the control terminal of the compensation circuit, respectively;

the second resistance module includes: a second resistor, a third resistor and an adjustable resistance device;

a first terminal of the second resistor is connected to the control terminal of the compensation circuit, a second terminal of the second resistor is connected to a first electrode of the adjustable resistance device, a control electrode of the adjustable resistance device is connected to an output terminal of the comparison module, a second electrode of the adjustable resistance device is connected to the second power supply terminal, and a resistance between the first electrode and the second electrode of the adjustable resistance device is positively correlated with a voltage of the control electrode; and two terminals of the third resistor are connected to the first power supply terminal and the second power supply terminal, respectively.

In some embodiments, the adjustable resistance device includes a triode, the control electrode of the adjustable resistance device is a base electrode of the triode, and one of the first electrode and the second electrode of the adjustable resistance device is an emitter electrode of the triode and the other one is a collector electrode of the triode.

In some embodiments, the voltage generating sub-circuit includes: a fourth resistor, and two terminals of the fourth resistor are connected to the sensing terminal of the compensation circuit and the data receiving terminal, respectively.

In some embodiments, the target data voltage P_Vdata=Vss−$I_{target}$×r4, where Vss is the voltage of the second power supply terminal, $I_{target}$ is a target value of the drive current, and r4 is a resistance value of the fourth resistor.

In some embodiments, the gating sub-circuit includes: a first gating transistor and a second gating transistor, a control electrode of the first gating transistor is connected to the scanning line, a first electrode of the first gating transistor is connected to the control electrode of the drive transistor, and a second electrode of the first gating transistor is connected to the control terminal of the compensation circuit; and a control electrode of the second gating transistor is connected to the scanning line, a first electrode of the second gating transistor is connected to the second electrode of the light emitting device, and a second electrode of the second gating transistor is connected to the sensing terminal of the compensation circuit.

In some embodiments, the pixel circuit further includes: a light emitting control module, and the light emitting control module is configured to control connection and disconnection between the second electrode of the light emitting device and the second power supply terminal in response to a signal of a light emitting control line.

In some embodiments, the light emitting control module includes: a light emitting control transistor, a control electrode of the light emitting control transistor is connected to the light emitting control line, a first electrode of the light emitting control transistor is connected to the second electrode of the light emitting device, and a second electrode of the light emitting control transistor is connected to the second power supply terminal.

The embodiments of the present disclosure further provide a display device, including a display substrate, the display substrate is provided thereon with a plurality of the display drive circuits as described above, the display substrate includes pixels in a plurality of rows and a plurality of columns, each pixel is provided therein with the pixel circuit, and pixel circuits in a same column of pixels share a same compensation circuit.

The embodiments of the present disclosure further provide a drive method of a display drive circuit, for driving the above display drive circuit, and the drive method includes:

at a scanning stage, applying a target data voltage to the data receiving terminal and applying a valid level signal to the scanning line, so that the drive transistor outputs a drive current to the light emitting device, and generating, by the voltage generating sub-circuit, a sensing voltage positively correlated with the drive current according to the drive current flowing through the light emitting device and the target data voltage of the data receiving terminal; adjusting, by the voltage adjusting sub-circuit, a voltage of the control terminal according to relationship of magnitude between the sensing voltage output by the voltage generating sub-circuit and a voltage of the second power supply terminal until the sensing voltage output by the voltage generating sub-circuit is equal to the voltage of the second power supply terminal; and storing a voltage between two terminals of the storage capacitor by the storage capacitor; and at a display stage, applying an invalid level signal to the scanning line, so that the gate electrode of the drive transistor and the control terminal of the compensation circuit are disconnected and the second electrode of the light emitting device and the sensing terminal of the compensation circuit are disconnected; and providing, by the drive transistor, the drive current to the light emitting device according to the voltage stored by the storage capacitor.

In some embodiments, the pixel circuit further includes a light emitting control module, and the drive method further includes:

at the scanning stage, applying an invalid level signal to the light emitting control line, so that the second electrode of the light emitting device and the second power supply terminal are disconnected; and at the display stage, applying a valid level signal to the light emitting control line, so that the second electrode of the light emitting device is connected to the second power supply terminal.

BRIEF DESCRIPTION OF DRAWINGS

The accompanying drawings are used to provide further understanding of the present disclosure and constitute a part of the specification. The accompany drawings, together with the following specific implementations, are used to explain the present disclosure, but do not constitute a limitation to the present disclosure. In the accompanying drawings.

DETAIL DESCRIPTION OF EMBODIMENTS

Figure 1:
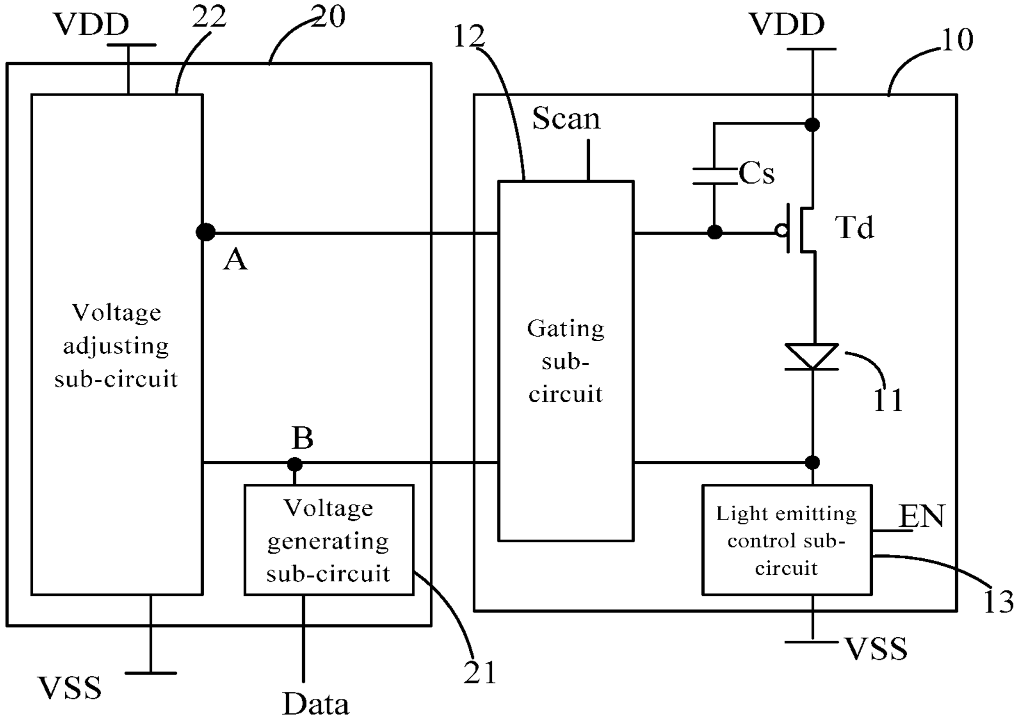
FIG. 1 is a schematic diagram of a circuit structure of a display drive circuit according to an embodiment of the present disclosure.

The specific implementations of the present disclosure are described in detail below with reference to the accompanying drawings. It should be understood that the specific implementations described herein are only used to illustrate and interpret the present disclosure and are not intended to limit the present disclosure.

In an OLED display panel, due to the limitation of the process condition, the threshold voltages of drive transistors in respective pixel units may be different; furthermore, due to the influence of environmental factors (such as temperature), the voltages of the drive transistors may drift. Therefore, when a light emitting device is driven to emit light, drive currents provided to different light emitting devices may be different, thereby resulting in poor brightness uniformity of the light emitting devices. In addition, with the increasing size of the panel, power supply voltages received by the pixel circuits in different pixel units will be different due to the presence of IR drop, which also results in non-uniform light emitting brightness of the light emitting devices.

In some related art, the structure of the pixel circuit is adjusted to make the drive current provided by the drive transistor to the light emitting device unrelated to a power supply voltage; however, the IR drop of the power supply voltage not only affects the gate-source voltage of the drive transistor, but also affects the source-drain voltage of the drive transistor. Under the same gate-source voltage, the source-drain voltage increases as the power supply voltage increases; and the source-drain voltage decreases as the power supply voltage decreases. Due to the channel modulation effect, the actual I/V characteristic curve of the transistor in a saturated state is not a horizontal straight line, but is an oblique line with a certain slope. Therefore, when the power supply voltages applied to different pixel circuits are different, even if the gate-source voltages of the drive transistors are the same, the drive currents will be different due to different power supply voltages, thereby resulting in non-uniform display effect.

In the embodiments of the present disclosure, a case where the light emitting device is an organic light emitting diode (OLED) is taken as an example for description.

In addition, each transistor in the embodiments of the present disclosure may be independently selected from one of a polysilicon thin film transistor, an amorphous silicon thin film transistor, an oxide thin film transistor and an organic thin film transistor. A "control electrode" in the present disclosure specifically refers to a gate electrode of the transistor, a "first electrode" specifically refers to a source electrode of the transistor, and a "second electrode" specifically refers to a drain electrode of the transistor. Of course, those skilled in the art should know that the "first electrode" and the "second electrode" are interchangeable.

In addition, transistors may be classified into N-type transistors and P-type transistors, and each transistor in the present disclosure may be independently selected from the N-type transistors or the P-type transistors; and in the following embodiments, a case where each transistor in the display drive circuit is a P-type transistor is taken as an example for exemplary description, and in this case, the transistors in the display drive circuit may be fabricated by the same fabricating process at the same time. Correspondingly, a valid level signal is a low level signal, and an invalid level signal is a high level signal.

The embodiments of the present disclosure provide a display drive circuit. FIG. 1 is a schematic diagram of a circuit structure of a display drive circuit according to an embodiment of the present disclosure. As shown in FIG. 1, the display drive circuit includes: a pixel circuit 10 and a compensation circuit 20. The pixel circuit 10 includes: a drive transistor Td, a light emitting device 11 and a storage capacitor Cs, and further includes a gating sub-circuit 12. Two terminals of the storage capacitor Cs are respectively connected to a control electrode and a first electrode of the drive transistor Td, the first electrode of the drive transistor Td is connected to a first power supply terminal VDD, a second electrode of the drive transistor Td is connected to a first electrode of the light emitting device 11, and the drive transistor Td is configured to provide a drive current to the light emitting device 11.

The gating sub-circuit 12 is configured to control connection and disconnection between a gate electrode of the drive transistor Td and a control terminal A of the compensation circuit 20 and control connection and disconnection between a second electrode of the light emitting device 11 and a sensing terminal B of the compensation circuit 20 in response to a signal of a scanning line Scan. For example, when the signal of the scanning line Scan is a valid level signal, the gating sub-circuit 12 connects the gate electrode of the drive transistor Td and the control terminal A of the compensation circuit 20 and connects the second electrode of the light emitting device 11 and the sensing terminal B; and when the signal of the scanning line Scan is an invalid level signal, the gating sub-circuit 12 disconnects the gate electrode of the drive transistor Td from the control terminal A of the compensation circuit 20 and disconnects the second electrode of the light emitting device 11 from the sensing terminal B.

The compensation circuit 20 includes a voltage generating sub-circuit 21 and a voltage adjusting sub-circuit 22. The voltage generating sub-circuit 21 is configured to generate a sensing voltage positively correlated with the drive current according to the drive current flowing through the light emitting device 11 and a target data voltage of a data receiving terminal Data. For example, the voltage generating sub-circuit 21 is connected to the data receiving terminal Data and the sensing terminal B of the compensation circuit 20; and when the gating sub-circuit 12 connects the control electrode of the drive transistor Td and the control terminal A of the compensation circuit 20 and connects the second electrode of the light emitting device 11 and the sensing terminal B, the voltage generating sub-circuit 21 is connected in series with the light emitting device 11, so as to receive the drive current. The voltage adjusting sub-circuit 22 is configured to adjust a voltage of the control terminal A according to a relationship of magnitude between the sensing voltage output by the voltage generating sub-circuit 21 and a voltage of the second power supply terminal VSS until the sensing voltage output by the voltage generating sub-circuit 21 is equal to the voltage of the second power supply terminal VSS.

In the embodiments of the present disclosure, the second electrode of the light emitting device 11 may be connected to the second power supply terminal VSS at a display stage. The target data voltage may be set according to a target value of the drive current actually required, so that when the drive current provided by the drive transistor Td to the light emitting device 11 reaches the target value, the sensing voltage generated by the voltage generating sub-circuit 21 is equal to the voltage of the second power supply terminal VSS. For example, the voltage generating sub-circuit 21 includes a resistor with a resistance value of r; at the display stage, the light emitting device 11 and the second power supply terminal VSS are connected, and the voltage of the second power supply terminal VSS is Vss; and in this case, the target data voltage P_Vdata may be set as: $P\_Vdata=Vss-I_0 \times r$.

In the embodiments of the present disclosure, the magnitude of the drive current flowing through the light emitting device 11 depends on a voltage difference between the first electrode and the control electrode of the drive transistor Td, that is, when the control terminal A of the compensation circuit 20 and the control electrode of the drive transistor Td are connected and the second electrode of the light emitting device 11 and the sensing terminal B of the compensation circuit 20 are connected, the magnitude of the drive current flowing through the light emitting device 11 depends on a voltage difference between the control terminal A and the first power supply terminal VDD. When an actual value of the drive current reaches the target value, the voltage between the control electrode and the first electrode of the drive transistor Td is recorded as Vgs0; when the actual value of the drive current is different from the target value, the voltage between the control electrode and the first electrode of the drive transistor Td is recorded as Vgs1.

Then, in the embodiments of the present disclosure, when the actual value of the drive current is different from the target value, Vgs1 gradually approaches Vgs0 by adjusting the voltage of the control terminal A by the voltage adjusting sub-circuit 22, so that the sensing voltage gradually approaches the voltage of the second power supply terminal VSS. When Vgs1 and Vgs0 are equal, the drive current flowing through the light emitting device 11 reaches the target value, and the sensing voltage is equal to the voltage of the second power supply terminal VSS. At this time, the voltage adjusting sub-circuit 22 stops adjusting the voltage of the control terminal A, and due to the voltage storage effect of the storage capacitor Cs, the voltage between the control electrode and the first electrode of the drive transistor Td remains at the current value. Therefore, after the gating sub-circuit 12 disconnects the control electrode of the drive transistor Td from the control terminal A of the compensation circuit 20 and disconnects the second electrode of the light emitting device 11 from the sensing terminal of the compensation circuit 20, the drive current flowing through the light emitting device 11 remains at the target value, so that the problem of non-uniform brightness of different light emitting devices 11 caused by voltage drop or the threshold drift of the drive transistor Td is alleviated.

In some embodiments, the pixel circuit 10 further includes: a light emitting control sub-circuit 13, and the light emitting control sub-circuit 13 is configured to control connection and disconnection between the second electrode of the light emitting device 11 and the second power supply terminal VSS in response to a signal of a light emitting control line EN. For example, when the light emitting control line EN is applied with a valid level signal, the second electrode of the light emitting device 11 and the second power supply terminal VSS are connected; and when the light emitting control line EN is applied with an invalid level signal, the second electrode of the light emitting device 11 and the second power supply terminal VSS are disconnected. Here, the light emitting control line EN may be applied with the invalid level signal at the scanning stage, and the light emitting control line EN may be applied with the valid level signal at the display stage after the scanning stage, so that the voltage of the second electrode of the light emitting device 11 is equal to the voltage when the adjusting sub-circuit stops adjustment, and it can be ensured that the current flowing through the light emitting device 11 at the display stage reaches the target value.

Figure 2:
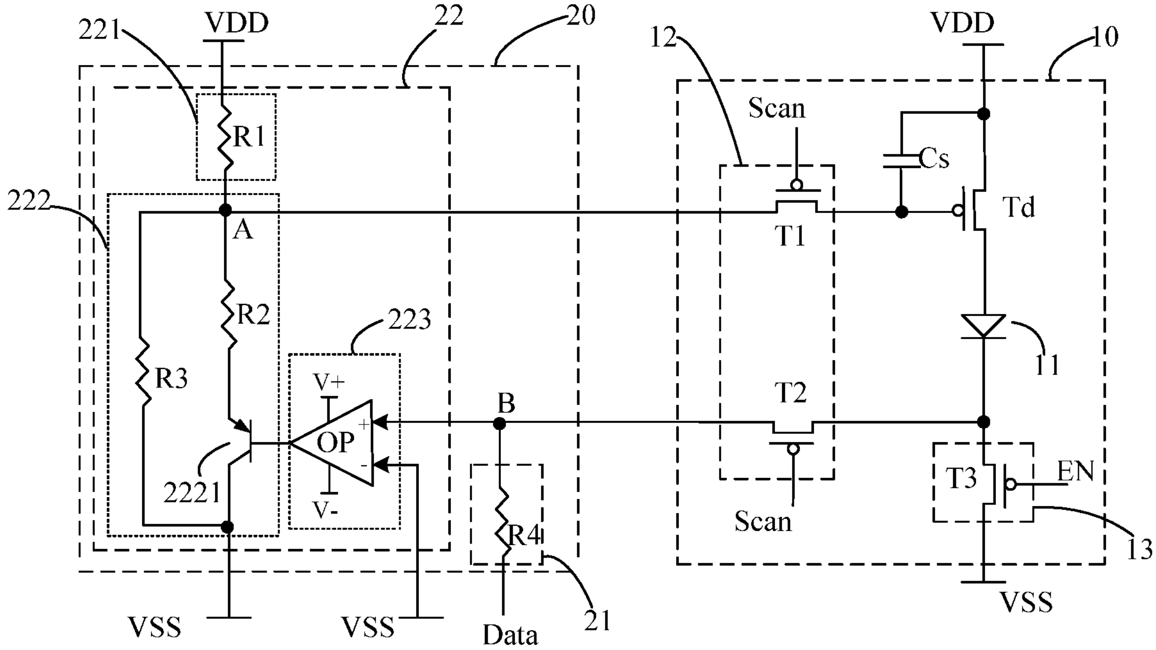
FIG. 2 is a schematic circuit diagram of another display drive circuit according to an embodiment of the present disclosure.

FIG. 2 is a schematic circuit diagram of another display drive circuit according to an embodiment of the present disclosure. As shown in FIG. 2, the display drive circuit is a specific implementation of the display drive circuit shown in FIG. 1.

As shown in FIG. 2, in some embodiments, the voltage adjusting sub-circuit 22 includes: a comparison module 223, a first resistance module 221 and a second resistance module 222. The comparison module 223 is connected to the voltage generating sub-circuit 21, the second power supply terminal VSS and the second resistance module 222, the comparison module 223 is configured to output a voltage to the second resistance module 222, and when the sensing voltage output by the voltage generating sub-circuit 21 is greater than the voltage of the second power supply terminal VSS, the output voltage is increased until the sensing voltage output by the voltage generating sub-circuit 21 is equal to the voltage of the voltage of the second power supply terminal VSS; and when the sensing voltage output by the voltage generating sub-circuit 21 is less than the voltage of the second power supply terminal VSS, the output voltage is decreased until the sensing voltage output by the voltage generating sub-circuit 21 is equal to the voltage of the second power supply terminal VSS.

For example, the comparison module 223 includes an operational amplifier OP, a non-inverting input terminal of the operational amplifier OP is connected to the voltage generating sub-circuit 21, an inverting input terminal of the operational amplifier OP is connected to the second power supply terminal VSS, and an output terminal of the operational amplifier OP is connected to the second resistance module 222.

As shown in FIG. 2, the first resistance module 221 and the second resistance module 222 are connected in series between the first power supply terminal VDD and the second power supply terminal VSS, a connecting node between the first resistance module 221 and the second resistance module 222 is the sensing terminal B of the compensation circuit 20, the second resistance module 222 has an adjustable resistance, and the resistance of the second resistance module 222 is positively correlated with the voltage output by the comparison module 223.

For example, the first resistance module 221 includes a first resistor R1, and two terminals of the first resistor R1 are connected to the first power supply terminal VDD and the control terminal A of the compensation circuit 20, respectively. The second resistance module 222 includes: a second resistor R2, a third resistor R3 and an adjustable resistance device 2221. A first terminal of the second resistor R2 is connected to the control terminal A of the compensation circuit 20, a second terminal of the second resistor R2 is connected to a first electrode of the adjustable resistance device 2221, a control electrode of the adjustable resistance device 2221 is connected to an output terminal of the comparison module 223, a second electrode of the adjustable resistance device 2221 is connected to the second power supply terminal VSS, the resistance between the first electrode and the second electrode of the adjustable resistance device 2221 is positively correlated with the voltage of the control electrode, and two terminals of the third resistor R3 are connected to the first power supply terminal VDD and the second power supply terminal VSS, respectively.

For example, the adjustable resistance device 2221 includes a triode, the control electrode of the adjustable resistance device 2221 is a base electrode of the triode, and one of the first electrode and the second electrode of the adjustable resistance device 2221 is an emitter electrode of the triode and the other one is a collector electrode of the triode. Optionally, the triode is a PNP triode, and when the PNP triode operates in a variable resistance region, the resistance value of the PNP triode increases with the increase of the output voltage of the operational amplifier OP.

The operational amplifier OP is also connected to a positive power supply terminal V+ and a negative power supply terminal V−, and the range of the output voltage of the operational amplifier OP is between voltages provided by the positive power supply terminal V+ and the negative power supply terminal V−. The values of the voltages of the positive power supply terminal V+ and the negative power supply terminal V− may be determined according to the characteristics of the triode, so that when the output voltage of the operational amplifier OP is between the voltages provided by the positive power supply terminal V+ and the negative power supply terminal V−, the triode operates in the variable resistance region. For example, the positive power supply terminal V+ provides a voltage of +5V, and the negative power supply terminal V− provides a voltage of −5V. The operational amplifier OP outputs an initial voltage when being powered on, so that the adjustable resistance device 2221 has an initial resistance; and then, the operational amplifier OP adjusts its output voltage according to inputs to the non-inverting input terminal and the inverting input terminal thereof.

In some embodiments, the voltage generating sub-circuit 21 includes: a fourth resistor R4, and two terminals of the fourth resistor R4 are connected to the sensing terminal of the compensation circuit 20 and the data receiving terminal Data, respectively.

Optionally, the target data voltage P_Vdata is determined according to the following formula:

$$P\_Vdata = Vss - I_{target} \times r4$$

where Vss is a voltage of the second power supply terminal VSS, $I_{target}$ is a target value of the drive current, and r4 is a resistance value of the fourth resistor. Optionally, the second power supply terminal VSS is grounded, and Vss is 0 V.

In some embodiments, the gating sub-circuit 12 includes: a first gating transistor T1 and a second gating transistor T2. A control electrode of the first gating transistor T1 is connected to a scanning line Scan, a first electrode of the first gating transistor T1 is connected to a gate electrode of the drive transistor Td, and a second electrode of the first gating transistor T1 is connected to the control terminal A of the compensation circuit 20, A control electrode of the second gating transistor T2 is connected to the scanning line Scan, a first electrode of the second gating transistor T2 is connected to the second electrode of the light emitting device 11, and a second electrode of the second gating transistor T2 is connected to the sensing terminal B of the compensation circuit 20.

In some embodiments, the light emitting control sub-circuit 13 includes: a light emitting control transistor T3. A control electrode of the light emitting control transistor T3 is connected to a light emitting control line EN, a first electrode of the light emitting control transistor T3 is connected to the second electrode of the light emitting device 11, and a second electrode of the light emitting control transistor T3 is connected to the second power supply terminal VSS.

Figure 3:
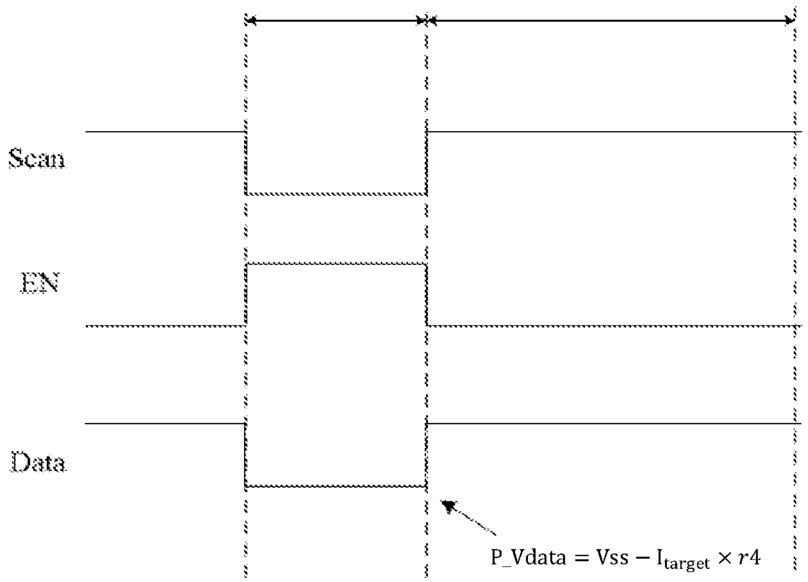
FIG. 3 is an operating sequence diagram of the display drive circuit shown in FIG. 2.

FIG. 3 is an operating sequence diagram of the display drive circuit shown in FIG. 2. The operating process of the display drive circuit shown in FIG. 2 is described with referenced to the accompanying drawings. As shown in FIG. 3, the operating process of the display drive circuit includes a scanning stage and a display stage. The target data voltage P_Vdata=Vss−$I_{target}$×r4.

Figure 4:
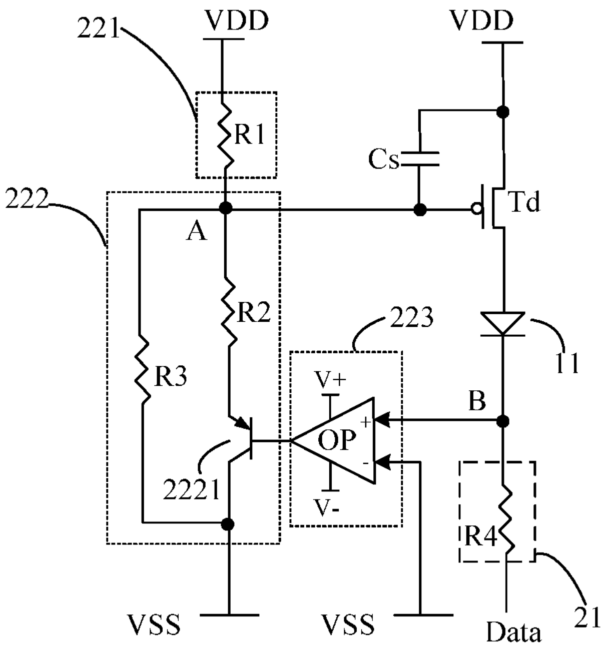
FIG. 4 is an equivalent circuit diagram of a display drive circuit according to an embodiment of the present disclosure at a scanning stage.

At the scanning stage t1, the scanning line Scan is applied with a valid level signal, and the light emitting control line EN is applied with an invalid level signal. At this time, the first gating transistor T1 and the second gating transistor T2 are turned on, the light emitting control transistor T3 is turned off, and the equivalent circuit diagram of the display drive circuit is shown in FIG. 4.

At the initial moment of the scanning stage, the magnitude of the drive current flowing through the light emitting device 11 is $I_{actual}$, the operational amplifier OP is in a virtual open circuit state, and no current flows through the non-inverting input terminal, so all the drive current flowing through the light emitting device 11 passes through the fourth resistor R4, and at this time, the voltage VB of the sensing terminal B of the compensation circuit 20 satisfies: $V_B$=P_Vdata+$I_{actual}$×r4=Vss+($I_{actual}$−$I_{target}$)×r4. Then, the operational amplifier OP detects the voltage VB of the sensing terminal B, and compares the voltage VB with the voltage Vss of the second power supply terminal VSS.

When $I_{actual}$<$I_{target}$, VB<Vss. In this case, the output voltage of the operational amplifier OP is decreased, thereby controlling on degree of the triode to increase and further decreasing the resistance value of the triode. When the resistance value of the triode is decreased, the whole resistance value of the second resistance module 222 is decreased, so that the voltage of the control terminal A of the compensation circuit 20 is decreased, the voltage of the control electrode of the drive transistor Td is decreased, the voltage difference between the control electrode and the first electrode is increased, and the drive current provided by the drive transistor Td to the light emitting device 11 is increased to gradually approach $I_{target}$ until $I_{actual}$−$I_{target}$ When $I_{actual}$=$I_{target}$, VB=Vss. In this case, the operational amplifier OP maintains the current output voltage, so that the triode maintains the current resistance value unchanged, and the drive current provided by the drive transistor Td to the light emitting device 11 is maintained at the current value.

When $I_{actual}$>$I_{target}$, VB>Vss. In this case, the output voltage of the operational amplifier OP is increased, thereby controlling the on degree of the triode to decrease and further increasing the resistance value of the triode. When the resistance value of the triode is increased, the whole resistance value of the second resistance module 222 is increased, so that the voltage of the control terminal A of the compensation circuit 20 is increased, the voltage of the control electrode of the drive transistor Td is increased, the voltage difference between the control electrode and the first electrode is decreased, and the drive current provided by the drive transistor Td to the light emitting device 11 is decreased to gradually approach $I_{target}$ until $I_{actual}$−$I_{target}$. When $I_{actual}$=$I_{target}$, VB=Vss. In this case, the operational amplifier OP maintains the current output voltage, so that the triode maintains the current resistance value unchanged, and the drive current provided by the drive transistor Td to the light emitting device 11 is maintained at the current value.

By constantly adjusting the resistance of the triode, the drive current provided by the drive transistor Td to the light emitting device 11 finally reaches the target value $I_{target}$ after the scanning stage is completed. At this time, the voltage of the control terminal A of the compensation circuit 20 is written into the storage capacitor Cs, and the voltage of the second electrode of the light emitting device 11 reaches the voltage of the second power supply terminal VSS.

The voltage $V_A$ of the control terminal A satisfies:

$$V_A = Vdd \times \frac{(r2 + r0)//r3}{r1 + (r2 + r0)//r3},$$

where Vdd is the voltage of the first power supply terminal VDD, r1 is the resistance value of the first resistor R1, r2 is the resistance value of the second resistor R2, r3 is the resistance value of the third resistor R3, and r0 is the resistance value of the triode. The triode is equivalent to a short circuit when being fully turned on, at this time, the voltage $V_A$ of the control terminal A satisfies:

$$V_A = Vdd \times \frac{r2 // r3}{r1 + r2 // r3},$$

and this voltage is the minimum voltage output by the control terminal A. The triode is equivalent to an open circuit when being fully turned off, at this time, the voltage $V_A$ of the control terminal A satisfies:

$$V_A = Vdd \times \frac{r3}{r1 + r3},$$

and this voltage is the maximum voltage output by the control terminal A.

Figure 5:
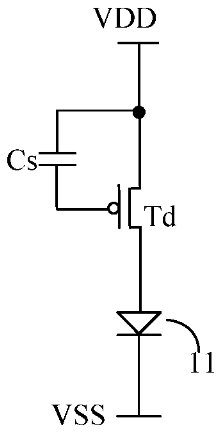
FIG. 5 is an equivalent circuit diagram of a display drive circuit according to an embodiment of the present disclosure at a display stage.

At the display stage t2, the scanning line Scan is applied with an invalid level signal, and the light emitting control line is applied with a valid level signal. Therefore, the first gating transistor T1 and the second gating transistor T2 are turned off, and the light emitting control transistor T3 is turned on. At this time, the equivalent circuit diagram of the display drive circuit is shown in FIG. 5.

Under the voltage-stabilizing effect of the storage capacitor Cs, the voltage difference between the control electrode and the first electrode of the drive transistor Td maintains the same as that when the scanning stage ends. Therefore, the drive current flowing through the light emitting device 11 is maintained as $I_{target}$.

In the embodiments of the present disclosure, a pixel circuit in the display drive circuit may be disposed in a pixel unit of a display substrate, and the compensation circuit 20 may be disposed outside a display area. For the pixel circuits in different pixel units, even if the voltages of the first power supply terminals VDD are different and the threshold voltages of the drive transistors Td are different, the drive current flowing through each light emitting device 11 can reach the target value by adjusting the voltage of the control terminal A by the compensation circuit 20, so that the display uniformity is improved. Furthermore, the structure of the pixel circuit 10 can be simplified. In addition, the control electrode of the drive transistor Td is directly applied with a direct-current voltage, therefore the writing time is shorter, and the scanning time can be reduced.

Figure 6:
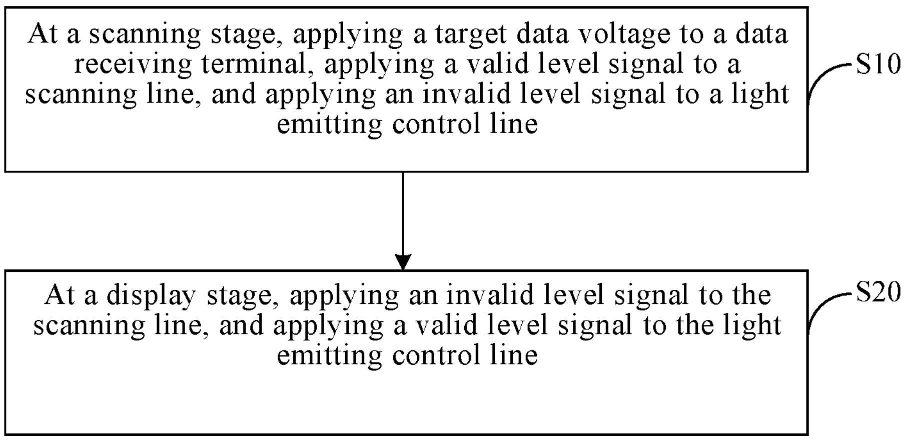
FIG. 6 is a flowchart of a drive method of a display drive circuit according to an embodiment of the present disclosure.

FIG. 6 is a flow chart of a drive method of a display drive circuit according to an embodiment of the present disclosure. The display drive circuit adopts the display drive circuit provided by any one of the above embodiments. As shown in FIG. 6, the drive method includes the following steps.

In step S10: at a scanning stage, a target data voltage is applied to the data receiving terminal, a valid level signal is loaded to the scanning line, so that the drive transistor outputs a drive current to the light emitting device, and the voltage generating sub-circuit generates a sensing voltage positively correlated with the drive current according to the drive current flowing through the light emitting device and a target data voltage of the data receiving terminal; the voltage adjusting sub-circuit adjusts a voltage of the control terminal according to a relationship of magnitude between the sensing voltage output by the voltage generating sub-circuit and a voltage of a second power supply terminal until the sensing voltage output by the voltage generating sub-circuit is equal to the voltage of the second power supply terminal; and the storage capacitor stores a voltage between two terminals of the storage capacitor.

In step S20: at a display stage, an invalid level signal is applied to the scanning line, so that a gate electrode of the drive transistor and the control terminal of the compensation circuit are disconnected and the second electrode of the light emitting device and the sensing terminal of the compensation circuit are disconnected; and the drive transistor provides the drive current to the light emitting device according to the voltage stored by the storage capacitor.

As described above, in some embodiments, the pixel circuit further includes a light emitting control sub-circuit. In this case, the step S10 further includes: applying an invalid level signal to a light emitting control line; and the step S20 further includes: applying a valid level signal to the light emitting control line.

The specific description of the step S10 and the step S20 may refer to the corresponding contents in the above embodiments, which will not be repeated here.

The embodiments of the present disclosure further provide a display device, including a display substrate, and a plurality of the display drive circuits as described above are provided on the display substrate.

Figure 7:
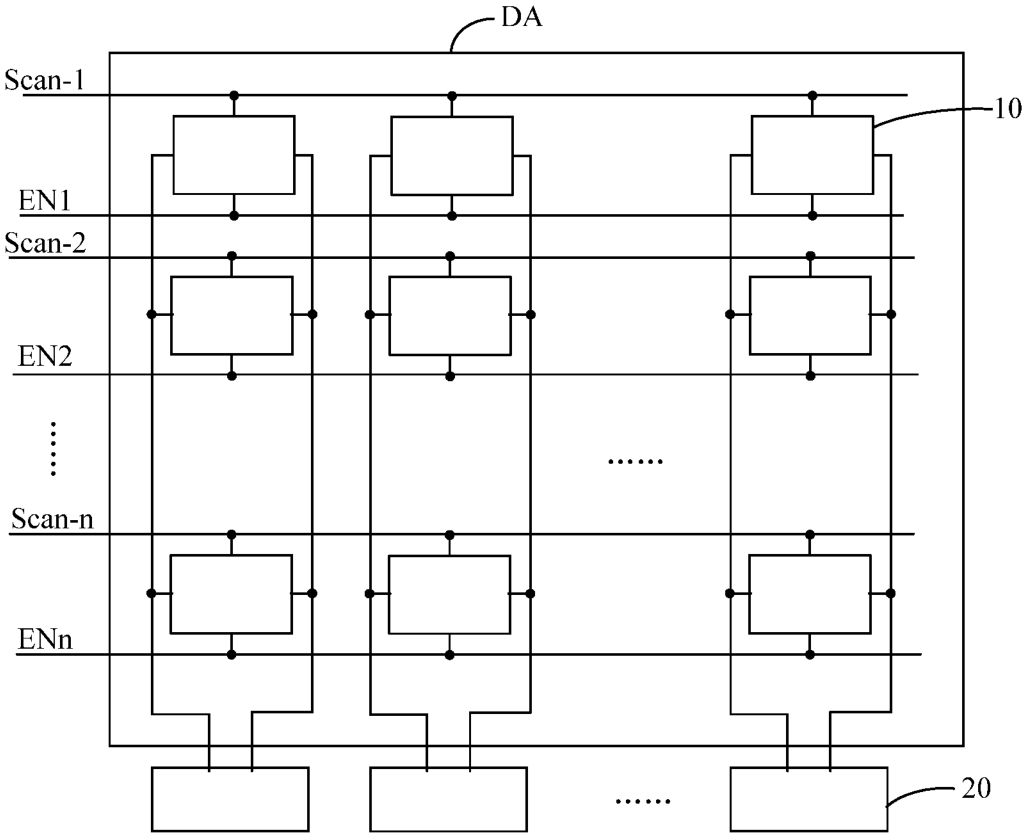
FIG. 7 is a schematic diagram of a plurality of display drive circuits according to an embodiment of the present disclosure.

FIG. 7 is a schematic diagram of a plurality of display drive circuits according to an embodiment of the present disclosure. As shown in FIG. 7, the display substrate includes pixels in a plurality of rows and a plurality of columns, each pixel is provided therein with the pixel circuit 10, and the pixel circuits 10 in a same column of pixels share a same compensation circuit 20. Specifically, the expression "the pixel circuits 10 in a same column of pixels share a same compensation circuit 20" means that the first gating transistors in the same column of pixel circuits 10 are connected to the control terminal of the same compensation circuit 20, and the second gating transistors in the same column of pixel circuits are connected to the sensing terminal of the same compensation circuit 20.

As shown in FIG. 7, the compensation circuit 20 is located outside the display area DA, and the pixel circuits 10 are located in the display area DA. The display substrate is provided thereon with a plurality of scanning lines Scan-1, Scan-2, . . . , and Scan-n, and is further provided thereon with a plurality of light emitting control lines EN1, EN2, . . . , and ENn. The pixel circuits 10 in a same row are connected to a same scanning line, and the pixel circuits 10 in a same row are connected to a same light emitting control line. When a plurality of display drive circuits are driven, a valid level signal may be provided to the scanning lines row by row, the operating sequence of each display drive circuit is the same as the sequence in FIG. 3, and for two adjacent rows, the scanning stage of the display drive circuits in the former row is after the scanning stage of the display drive circuits in the latter row, and may be immediately adjacent to the scanning stage of the display drive circuits in the latter row.

It should be noted that the display drive circuit in FIG. 2 is only a schematic circuit diagram. In an actual application, the first gating transistor T1 and the control terminal A of the compensation circuit 20 are connected through a signal line, and the second gating transistor T2 and the sensing terminal B of the compensation circuit 10 are connected through a signal line, and the signal lines have a certain resistance. Therefore, when the scanning stage ends, the voltage of the second electrode of the light emitting device 11 is $I_{target} \times R_{BC}$, where $R_{BC}$ is the resistance of the signal line between the second gating transistor T2 and the sensing terminal B of the compensation circuit 20; and at the display stage, the voltage of the second electrode of the light emitting device 11 is set as 0V, so that the source-drain voltage (that is, the voltage between the first electrode and the second electrode) of the drive transistor Td is increased. When the pixel circuits 10 in the same column share the same compensation circuit 20, the resistance $R_{BC}$ corresponding to a proximal pixel circuit 10 (i.e., a pixel circuit 10 proximal to the compensation circuit 20) is less than the resistance $R_{BC}$ corresponding to a distal pixel circuit 10 (i.e., a pixel circuit 10 distal to the compensation circuit 20). Therefore, in the case of the same target value of the drive currents required by the proximal pixel circuit 10 and the distal pixel circuit 10, there is a difference between the increased amplitudes of the source-drain voltage of a distal drive transistor Td and the source-drain voltage of a proximal drive transistor Td, and the difference is $I_{target} \times (R_{BC_{distal}} - R_{BC\ proximall})$ However, $I_{target}$ is usually small and is in nA scale, and compared with the difference in source-drain voltage between different drive transistors caused by IR drop in a conventional circuit, the difference in source-drain voltage in the embodiments of the present disclosure is negligible.

In the embodiments of the present disclosure, the compensation circuit adjusts the voltage of the control terminal, so that the drive current flowing through each light emitting device may substantially reach the target value, and the display uniformity is improved.

The display device according to the embodiments of the present disclosure may be any product or part with a display function, such as electronic paper, an OLED panel, a mobile phone, a tablet computer, a television, a display, a notebook computer, a digital photo frame, a navigator, or the like.

It could be understood that the above implementations are only exemplary implementations for describing the principle of the present disclosure, but the present disclosure is not limited thereto. Various modifications and improvements may be made by those of ordinary skill in the art without departing from the spirit and essence of the present disclosure, and are also regarded as falling within the protection scope of the present disclosure.

What is claimed is:

1. A display drive circuit, comprising: a pixel circuit and a compensation circuit, wherein the pixel circuit comprises: a drive transistor, a light emitting device and a storage capacitor, two terminals of the storage capacitor are connected to a control electrode and a first electrode of the drive transistor, respectively, the first electrode of the drive transistor is connected to a first power supply terminal, a second electrode of the drive transistor is connected to a first electrode of the light emitting device, and the drive transistor is configured to provide a drive current to the light emitting device;

the pixel circuit further includes: a gating sub-circuit configured to control connection and disconnection between the control electrode of the drive transistor and a control terminal of the compensation circuit and control connection and disconnection between a second electrode of the light emitting device and a sensing terminal of the compensation circuit in response to a signal of a scanning line; and the compensation circuit comprises:

a voltage generating sub-circuit configured to generate a sensing voltage positively correlated with the drive current according to the drive current flowing through the light emitting device and a target data voltage of a data receiving terminal; and a voltage adjusting sub-circuit configured to adjust a voltage of the control terminal according to relationship of magnitude between the sensing voltage output by the voltage generating sub-circuit and a voltage of a second power supply terminal until the sensing voltage output by the voltage generating sub-circuit is equal to the voltage of the second power supply terminal, wherein the voltage adjusting sub-circuit comprises: a comparison module, a first resistance module and a second resistance module, the comparison module is connected to the voltage generating sub-circuit, the second power supply terminal and the second resistance module, the comparison module is configured to output a voltage to the second resistance module, and when the sensing voltage output by the voltage generating sub-circuit is greater than the voltage of the second power supply terminal, the output voltage is increased until the sensing voltage output by the voltage generating sub-circuit is equal to the voltage of the second power supply terminal; when the sensing voltage output by the voltage generating sub-circuit is less than the voltage of the second power supply terminal, the output voltage is decreased until the sensing voltage output by the voltage generating sub-circuit is equal to the voltage of the second power supply terminal; and the first resistance module and the second resistance module are connected in series between the first power supply terminal and the second power supply terminal, a connecting node between the first resistance module and the second resistance module is the sensing terminal of the compensation circuit, the second resistance module has an adjustable resistance, and the resistance of the second resistance module is positively correlated with the output voltage of the comparison module.

2. The display drive circuit according to claim 1, wherein the comparison module comprises an operational amplifier, a non-inverting input terminal of the operational amplifier is connected to the voltage generating sub-circuit, an inverting input terminal of the operational amplifier is connected to the second power supply terminal, and an output terminal of the operational amplifier is connected to the second resistance module.

3. The display drive circuit according to claim 1, wherein the first resistance module comprises a first resistor, two terminals of the first resistor are connected to the first power supply terminal and the control terminal of the compensation circuit, respectively;

the second resistance module comprises: a second resistor, a third resistor and an adjustable resistance device;

a first terminal of the second resistor is connected to the control terminal of the compensation circuit, a second terminal of the second resistor is connected to a first electrode of the adjustable resistance device, a control electrode of the adjustable resistance device is connected to an output terminal of the comparison module, a second electrode of the adjustable resistance device is connected to the second power supply terminal, and a resistance between the first electrode and the second electrode of the adjustable resistance device is positively correlated with a voltage of the control electrode; and two terminals of the third resistors are connected to the first power supply terminal and the second power supply terminal, respectively.

4. The display drive circuit according to claim 3, wherein the adjustable resistance device comprises a triode, the control electrode of the adjustable resistance device is a base electrode of the triode, and one of the first electrode and the second electrode of the adjustable resistance device is an emitter electrode of the triode and the other one is a collector electrode of the triode.

5. The display drive circuit according to claim 1, wherein the voltage generating sub-circuit comprises: a fourth resistor, and two terminals of the fourth resistor are connected to the sensing terminal of the compensation circuit and the data receiving terminal, respectively.

6. The display drive circuit according to claim 5, wherein the target data voltage P_Vdata satisfies: P_Vdata=Vss−$I_{target}$×r4, where Vss is the voltage of the second power supply terminal, $I_{target}$ is a target value of the drive current, and r4 is a resistance value of the fourth resistor.

7. The display drive circuit according to claim 1, wherein the gating sub-circuit comprises: a first gating transistor and a second gating transistor, a control electrode of the first gating transistor is connected to the scanning line, a first electrode of the first gating transistor is connected to the control electrode of the drive transistor, and a second electrode of the first gating transistor is connected to the control terminal of the compensation circuit; and a control electrode of the second gating transistor is connected to the scanning line, a first electrode of the second gating transistor is connected to the second electrode of the light emitting device, and a second electrode of the second gating transistor is connected to the sensing terminal of the compensation circuit.

8. The display drive circuit according to claim 1, wherein the pixel circuit further comprises: a light emitting control module; and the light emitting control module is configured to control connection and disconnection between the second electrode of the light emitting device and the second power supply terminal in response to a signal of a light emitting control line.

9. The display drive circuit according to claim 8, wherein the light emitting control module comprises: a light emitting control transistor, a control electrode of the light emitting control transistor is connected to the light emitting control line, a first electrode of the light emitting control transistor is connected to the second electrode of the light emitting device, and a second electrode of the light emitting control transistor is connected to the second power supply terminal.

10. A display device, comprising a display substrate, wherein the display substrate is provided thereon with a plurality of display drive circuits each being the display drive circuit according to claim 1, the display substrate comprises pixels in a plurality of rows and a plurality of columns, each pixel is provided therein with the pixel circuit, and pixel circuits in a same column of pixels share a same compensation circuit.

11. A drive method of a display drive circuit, for driving the display drive circuit according to claim 1, wherein the drive method comprises:

at a scanning stage, applying a target data voltage to the data receiving terminal and applying a valid level signal to the scanning line, so that the drive transistor outputs a drive current to the light emitting device, and generating a sensing voltage positively correlated with the drive current by the voltage generating sub-circuit according to the drive current flowing through the light emitting device and the target data voltage of the data receiving terminal; adjusting a voltage of the control terminal by the voltage adjusting sub-circuit according to relationship of magnitude between the sensing voltage output by the voltage generating sub-circuit and a voltage of the second power supply terminal until the sensing voltage output by the voltage generating sub-circuit is equal to the voltage of the second power supply terminal; and storing a voltage between two terminals of the storage capacitor by the storage capacitor; and at a display stage, applying an invalid level signal to the scanning line, so that the gate electrode of the drive transistor and the control terminal of the compensation circuit are disconnected and the second electrode of the light emitting device and the sensing terminal of the compensation circuit are disconnected, and providing the drive current to the light emitting device by the drive transistor according to the voltage stored by the storage capacitor.

12. The drive method according to claim 11, wherein the pixel circuit further comprises a light emitting control module, and the drive method further comprises:

at the scanning stage, applying an invalid level signal to a light emitting control line, so that the second electrode of the light emitting device and the second power supply terminal are disconnected; and at the display stage, applying a valid level signal to the light emitting control line, so that the second electrode of the light emitting device is connected to the second power supply terminal.

13. The display drive circuit according to claim 3, wherein the voltage generating sub-circuit comprises: a fourth resistor, and two terminals of the fourth resistor are connected to the sensing terminal of the compensation circuit and the data receiving terminal, respectively.

14. The display drive circuit according to claim 13, wherein the target data voltage P_Vdata satisfies: P_Vdata=Vss−$I_{target}$×r4, where Vss is the voltage of the second power supply terminal, $I_{target}$ is a target value of the drive current, and r4 is a resistance value of the fourth resistor.

15. The display drive circuit according to claim 4, wherein the voltage generating sub-circuit comprises: a fourth resistor, and two terminals of the fourth resistor are connected to the sensing terminal of the compensation circuit and the data receiving terminal, respectively.

16. The display drive circuit according to claim 15, wherein the target data voltage P_Vdata satisfies: P_Vdata=Vss−$I_{target}$×r4, where Vss is the voltage of the second power supply terminal, $I_{target}$ is a target value of the drive current, and r4 is a resistance value of the fourth resistor.

17. The display drive circuit according to claim 4, wherein the gating sub-circuit comprises: a first gating transistor and a second gating transistor, a control electrode of the first gating transistor is connected to the scanning line, a first electrode of the first gating transistor is connected to the control electrode of the drive transistor, and a second electrode of the first gating transistor is connected to the control terminal of the compensation circuit; and a control electrode of the second gating transistor is connected to the scanning line, a first electrode of the second gating transistor is connected to the second electrode of the light emitting device, and a second electrode of the second gating transistor is connected to the sensing terminal of the compensation circuit.

18. The display drive circuit according to claim 4, wherein the pixel circuit further comprises: a light emitting control module; and the light emitting control module is configured to control connection and disconnection between the second electrode of the light emitting device and the second power supply terminal in response to a signal of a light emitting control line.

19. The display drive circuit according to claim 18, wherein the light emitting control module comprises: a light emitting control transistor, a control electrode of the light emitting control transistor is connected to the light emitting control line, a first electrode of the light emitting control transistor is connected to the second electrode of the light emitting device, and a second electrode of the light emitting control transistor is connected to the second power supply terminal.

* * * * *